United States Patent [19]

Jasionowicz et al.

[11] 4,143,197

[45] Mar. 6, 1979

[54] ARAMID YARN FABRICS AND METHOD OF DIMENSIONAL STABILIZATION OF SAME BY HEAT SETTING

[75] Inventors: Albert J. Jasionowicz, Clifton; Richard R. Saffadi, Ridgefield, both of N.J.

[73] Assignee: J. P. Stevens & Co., Inc., New York, N.Y.

[21] Appl. No.: 795,848

[22] Filed: May 11, 1977

[51] Int. Cl.$^2$ .................. A41D 27/02; B32B 27/02; B32B 27/34; D03D 15/00
[52] U.S. Cl. .................................. 428/225; 2/97; 2/243 A; 2/272; 28/165; 28/167; 66/202; 139/420 R; 156/281; 428/245; 428/253; 428/257; 428/298; 428/302; 428/474; 428/902; 428/913; 432/8
[58] Field of Search ............... 66/202; 139/420 R; 428/212, 225, 902, 913, 427, 298, 302, 474; 2/2.5, 167, 243 A, 272, 97; 156/60, 281

[56] References Cited

U.S. PATENT DOCUMENTS

| | | | |
|---|---|---|---|
| 3,286,490 | 11/1966 | Martin | 428/225 |
| 3,600,350 | 8/1971 | Kwolek | 260/3 |
| 3,620,892 | 11/1971 | Winckhofer | 428/253 |
| 3,883,898 | 5/1975 | Byrnes | 2/167 |
| 3,958,276 | 5/1976 | Clausen | 2/2.5 |
| 4,001,477 | 1/1977 | Ceonomy | 428/225 |
| 4,004,295 | 1/1977 | Byrnes | 2/167 |

OTHER PUBLICATIONS

Sheldon et al., Textile Research Journal, Nov. 1965, pp. 999–1008.

*Primary Examiner*—J.C. Cannon
*Attorney, Agent, or Firm*—Leitner, Palan, Martin & Bernstein

[57] ABSTRACT

An article of clothing having at least one layer of a fabric or a fabric having an aramid yarn knitted or woven with a heat settable yarn. The fabric is heated to set the heat settable yarn thereby dimensionally stabilizing the fabric without bonding. The fabric may be a scrim or a lining having a facing material laminated thereon.

21 Claims, 5 Drawing Figures

ARAMID YARN FABRICS AND METHOD OF DIMENSIONAL STABILIZATION OF SAME BY HEAT SETTING

BACKGROUND OF THE INVENTION

The present invention relates generally to aramid fiber containing fabric and more specifically to an article of clothing formed from aramid fiber yarn which is dimensionally stabilized.

Aramid fibers are known for their strength or abrasion resistance and have been used in protective garments. The combination of aramid fibers with metal wire to combine the characteristics of both are also known. U.S. Pat. Nos. 3,883,898 and 4,004,295 are two typical examples of the use of an aramid "Kevlar" to form garments.

Ballistic material or other high impact garments have used aramid fiber layers to increase the strength and resistance of penetration. This generally may include a plurality of aramid layers sewn together with a plurality of nylon or fiber material, as illustrated in U.S. Pat. No. 3,891,996. These ballistic aramid layers are substantially dimensionally stabilized by their compact knit or weave which also reduces flexibility of the fabric. In other high impact articles using fabrics of aramid fibers, the fabric is dimensionally stabilized using a resin as illustrated in U.S. Pat. No. 3,958,276.

Nonballistic, or more open knitted or woven fabrics containing aramid fiber yarns are not dimensionally stabilized as knitted or woven and thus are difficult to handle and cut. The fabric is sleazy and the patterns cut from the fabric do not retain their former structure. The prior art generally uses a resin to dimensionally stabilize these fabrics. A discussion of applicable fibers and yarns in an aramid fabric is discussed in example 23 of U.S. Pat. No. 3,600,350.

Known techniques for dimensionally stabilizing articles formed from polymeric materials generally include raising the temperature of a multiconstituent filament so as to cause fuse bonding or melting as described in U.S. Pat. No. 3,620,892. This and other methods of dimensional stabilization of articles are difficult to control and generally do not provide an aesthetically pleasing fabric.

Thus there exists a need for a method to dimensionally stabilize aramid yarn containing fabrics without the use of resin or fusion bonding to provide a flexible, open, high abrasion resistance fabric for use in articles of clothing.

SUMMARY OF THE INVENTION

The present invention provides an aramid yarn containing fabric which is dimensionally stabilized using heat settable yarn without bonding using resins or fusion. The aramid yarn, being a single or multi-constituent yarn, is woven or knitted with a heat settable yarn, for example, nylon, polyesters, polypropylenes, cottons, wools, etc. The fabric is then heat treated at a temperature and time sufficient to heat set the heat settable yarn so as to dimensionally stabilize the fabric without bonding. The aramid yarn may be continuous filament or spun. Article of clothing can comprise at least one or more layers of the dimensionally stabilized fabric and is preferably used as a stretchable and breathable lining with a face fabric laminated thereon. The fabric can also be a scrim having the heat settable yarn laid-in an open knit or as the leno yarn in a leno weave.

OBJECTS OF THE INVENTION

An object of the present invention is to provide a method of dimensionally stabilizing fabrics having aramid yarns without bonding.

Another object is to provide a method of dimensionally stabilizing fabric having aramid fiber yarn without the use of resins.

A further object of the present invention is to provide an article of clothing including a dimensionally stabilized fabric having aramid fiber yarn.

Still another object is to provide a fabric or scrim including aramid fiber yarns which is dimensionally stabilized without the use of resins or fusion bonding.

An even further object is to provide a lightweight, breathable, stretchable, high abrasion resistance resistance fabric for use in articles of clothing.

Other objects, advantages, and novel features of the present invention will become apparent from the following detailed description of the present invention when considered in conjunction with the accompanying drawings.

DESCRIPTION OF THE PREFERRED EMBODIMENTS

With the development of high abrasion, aramid fibers, efforts have been made to incorporate them in fabrics for protective clothing. Since aramid fibers are not heat settable, fabrics formed therefrom must be coated with a resin to provide dimensionally stabilized fabrics. Undimensionally stabilized fabrics are difficult to cut. The present invention combines aramid fiber yarns in either a woven or knitted configuration with a heat settable yarn wherein the final fabric is heat treated to heat set the heat settable yarn and thereby dimensionally stabilize the fabric.

Figure 1:
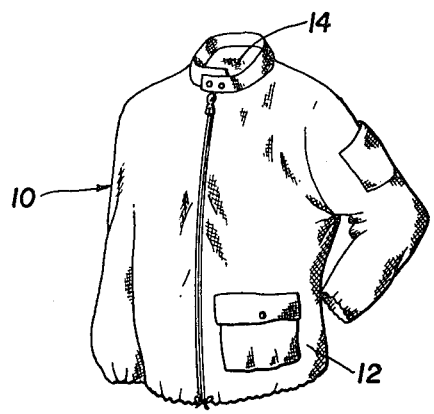
FIG. 1 is an article of clothing incorporating the dimensionally stabilized fabric according to the principles of the present invention.
Figure 2:
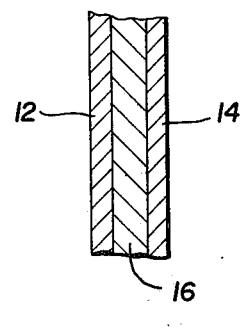
FIG. 2 is a cross section of the article of clothing of FIG. 1.

An article of clothing using the dimensionally stabilized fabric of the present invention is illustrated in FIG. 1 as a motorcycle jacket 10 having an exterior fabric 12 and an interior lining 14 separated by an insulating layer 16 as illustrated in FIG. 2. The exterior layer 12 may be leather or nylon or any other suitable material. The lining 14 is the dimensionally stabilized fabric of the present invention knitted in an open pattern such that the lining is stretchable and breathable. Preferably, the exterior layer 12 is nylon lamined directly to the lining 14 to provide a lightweight, flexible high abrasion resistance jacket.

Figure 3:
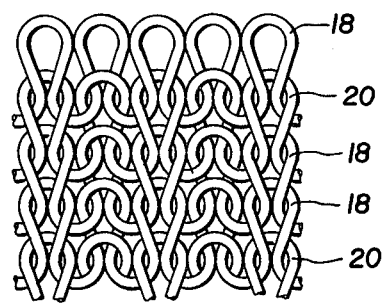
FIG. 3 is a schematic of a knitted fabric according to the present invention.
Figure 4:
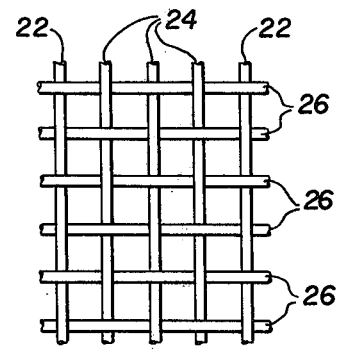
FIG. 4 is a woven fabric according to the principles of the present invention.

A typical double knit pattern is illustrated in FIG. 3 wherein threads or yarn 18 are of aramid fibers and threads or yarns 20 are of heat settable fibers. An example of a woven fabric is illustrated in FIG. 4 wherein the warp includes a plurality of heat settable fibers 22 and a plurality of aramid fibers 24. The weft threads 26 may be, for example, heat settable fibers. A knitted scrim is illustrated in FIG. 4 having a plurality of aramid fibers 28 layed-in and heat settable fibers knitted at 30.

A typical example of fabric formed according to the present invention uses "Kevlar", being a four hundred denier continuous filament yarn, on two bars of a four bar knitting machine and nylon 6,6 on the other two bars. The yarn feed may be to every other needle. Although thirteen needles and eighteen needles per inch were used to provide the open pattern for breathability, other number of needles per inch may be used. The fabric produced as just described are useful as lightweight breathable protective clothing such as jackets for television on-line tube inspectors, gloves, or linings for motorcycle jackets.

Figure 5:
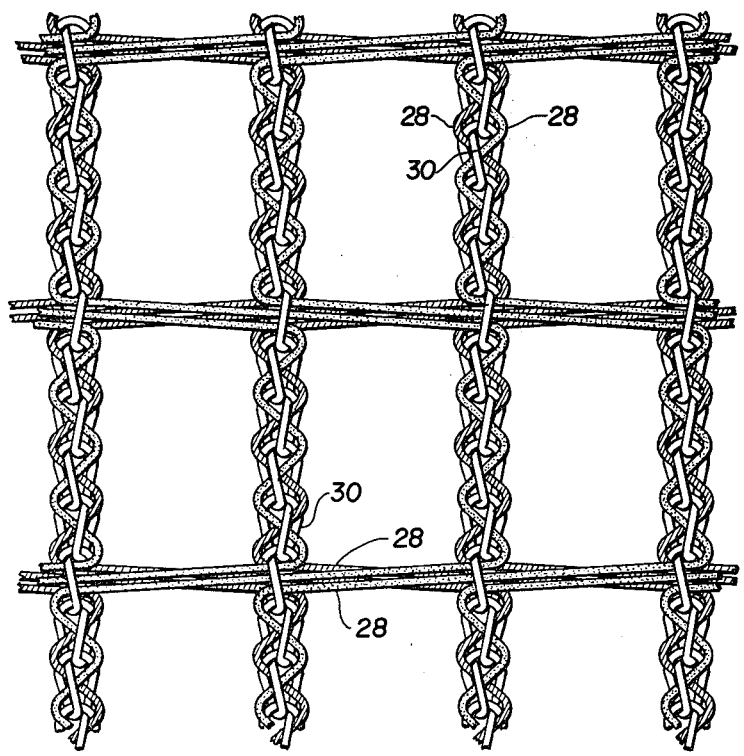
FIG. 5 is a knitted scrim formed according to the principles of the present invention.

The fabrics of the present invention may also be used as high-strength scrim reinforcements in laminates. The scrim of FIG. 5 may be formed on a four bar machine having six needles per inch. One of the bars knits only in the selvage and the three remaining bars, one feeding nylon and two feeding Kevlar, knit between the selvage. Kevlar was also laid-in in both the warp and fill direction. An equivalent open weave would be a leno weave with the heat settable yarn being the leno yarn or thread. The aramid yarn may be a spun yarn and used with a heat settable yarn, for example polyethylene terephthalate.

The fabric formed using the aramid yarn and the heat settable yarn is dimensionally stabilized by heat treating the fabric to heat set the heat settable yarn. The fabric is clamped in a frame and heated at a sufficient temperature for a sufficient amount of time to heat set the heat settable material without melting or fusion of the heat settable material to the aramid fiber. Table I illustrates the ranges of temperatures and times for selected heat settable materials.

TABLE I

|  | Time (Seconds) | Temperature ° F. |
|---|---|---|
| Nylon 6,6 | 30–180 | 360–420 |
| Nylon 6 | 30–180 | 350–400 |
| Polyester | 30–180 | 300–380 |
| Polypropylene | 30–220 | 250–310 |
| *Cotton | 30–180 | 250–275 |
| **Wool | 30–540 | 250–325 |

*Sanforize
**Dry/Full

These are but examples of heat settable fibers which may be used and are not considered to be limiting on the exact type of heat settable fibers used. Any heat settable polyamide, polyester, polyolefins, natural or synthetic fibers may be used. Since the aramid fibers generally can resist high temperatures, almost any heat settable yarn may be used. The only limitation on the use of the yarn and its processing is that the fabric containing the heat settable yarn and the aramid fiber be raised to a temperature sufficient to heat set the heat settable fibers yarn without melting or fuse bonding the heat settable yarn to itself and/or to the aramid fiber yarn.

To illustrate the utility of the aramid fiber fabric of the present invention and its abrasion resistance, a dimensionally stabilized aramid fiber fabric having a 100% nylon laminated thereon using urathane adhesive was compared with a leather motorcycle jacket available in the market. The Kevlar fabric was a Raschel knit on a four bar machine, two bar nylon and two bars 400 denier Kevlar. The Kevlar fabric was approximately 8 ounces per square yard and the nylon was approximately 3¾ ounces per square yard. The results are summarized in Table II.

TABLE II

|  | Test Results | |
|---|---|---|
| Tests Conducted | Kevlar Material (542-2) | Leather Sportswear by Brooks |
| Resistance to Abrasion, cycles (ASTM D 1175-71) Inflated Diaphragm Method Head Load - 1 lb. Pressure - 4 lbs./sq.in. Abradant - 40 Fastcut Degree of Wear - a Hole | 975 | 507 |
| Tearing Strength, lbs. (Tongue Method) |  |  |
| Length | 50.5 | 11.8 |
| Width | 25.4* | 8.5 |
| Breaking Strength, lbs. (Grab Method) |  |  |
| Length | 738.8 | 206.0 |
| Width | 693.8 | 138.5 |
| Bursting Strength, lbs. | ** | 288.2 |

*After initial rupture of knit fabric, the knit fabric unravels and face fabric tears.
**Over 500 lb capacity of machine.

The aramid fiber fabric had almost twice the abrasion resistance, three to five times the tearing strength and breaking strength, and at least twice the bursting strength of the leather jacket.

From the preceding description of the preferred embodiments, it is obvious that the objects of the invention are obtained to provide a dimensionally stabilized open, breathable, flexible lightweight aramid yarn containing fabric for use in articles of clothing. Although the invention has been described and illustrated in detail, it is to be clearly understood that the same is by way of illustration and example only and is not to be taken by way of limitation. The spirit and scope of this invention is to be limited only by the terms of the appended claims.

What is claimed:

1. An article of clothing comprising at least one layer of fabric having a single constituent aramid fiber yarn and a separate heat settable synthetic fiber yarn, said yarns being interrelated to form said one layer of fabric and said heat settable yarn being heat set to dimensionally stabilize said one layer of fabric without bonding said aramid fiber yarn to said heat settable yarn.

2. The article of clothing according to claim 1 wherein said yarns are knitted to form said fabric.

3. The article of clothing according to claim 1 wherein said yarns are woven to form said fabric.

4. The article of clothing according to claim 1 wherein said fabric is breathable and stretchable.

5. The article of clothing according to claim 4 wherein said fabric is a lining.

6. The article of clothing according to claim 1 including a second layer of material laminated to said first layer, said second layer being the exterior layer of said article of clothing.

7. A dimensionally stabilized fabric comprising a first yarn interrelated to a second yarn to form said fabric, said first yarn being a single constituent aramid fiber yarn and said second yarn being a heat settable synthetic fiber yarn, said second yarn being heat set to dimensionally stabilize the fabric without bonding.

8. The fabric according to claim 7 wherein said aramid fiber yarn is a continuous filament yarn.

9. The fabric according to claim 7 wherein said aramid fiber yarn is a single constituent spun yarn.

10. The fabric according to claim 7 wherein said second yarn is made of a polyamide, polyester, polyolefins, or synthetic fibers.

11. The fabric according to claim 7 wherein said yarns are woven in a leno weave and the leno yarn is said heat settable fiber yarn.

12. The fabric according to claim 7 wherein said yarns are knitted to form an open scrim.

13. A method for forming a dimensionally stabilized fabric having a single constituent aramid fiber yarn comprising interrelating aramid fiber yarns with a heat settable synthetic fiber yarn to form a desired fabric and heat treating said fabric at a temperature for a sufficient amount of time to heat set said heat settable yarn whereby said fabric is dimensionally stabilized without bonding.

14. The method according to claim 13 wherein said heat settable yarn is polyester heated in the range of 300° to 380° fahrenheit.

15. The method according to claim 13 wherein said heat settable yarn is polypropylene heated in the range of 250° to 310° farhenheit.

16. The method according to claim 13 wherein said aramid yarn is a single constituent, continuous filament yarn.

17. The method according to claim 13 wherein said aramid yarn is a spun yarn.

18. The method according to claim 13 including laminating a layer of a material to the surface of the dimensionally stabilized fabric.

19. The method according to claim 13 wherein said heat settable yarn is nylon 6 heated in the range of 360° to 420° fahrenheit for 30 to 180 seconds.

20. The method according to claim 13 wherein said heat settable yarn is nylon 6,6 heated in the range 350° to 400° fahrenheit for 30 to 180 seconds.

21. The method according to claim 13 wherein said heat settable yarn is heated for a period in the range of 30 to 220 seconds.

* * * * *

UNITED STATES PATENT AND TRADEMARK OFFICE
CERTIFICATE OF CORRECTION

PATENT NO. : 4,143,197

DATED : 6 March 1979

INVENTOR(S) : A. J. Jasionowicz et al.

It is certified that error appears in the above-identified patent and that said Letters Patent are hereby corrected as shown below:

Column 2, lines 16 and 17, delete second occurrence of "resistance".

Column 2, line 59, delete "lamined" and insert--laminated--.

Column 3, line 2, delete "layed-in" and insert--laid-in--.

Column 3, line 11, after described delete "are" and insert--is--.

Column 3, line 63, delete "urathane" and insert--urethane--.

Column 6, line 3, delete "farhenheit" and insert--fahrenheit--.

Signed and Sealed this

Nineteenth Day of February 1980

[SEAL]

Attest:

SIDNEY A. DIAMOND

*Attesting Officer*  *Commissioner of Patents and Trademarks*